United States Patent [19]

Haag et al.

[11] 4,445,192

[45] Apr. 24, 1984

[54] LOGIC STATE ANALYZER WITH TIME AND EVENT COUNT MEASUREMENT BETWEEN STATES

[75] Inventors: George A. Haag, Colorado Springs; O. Douglas Fogg, Loveland; Gordon A. Greenley; Steve A. Shepard, both of Colorado Springs, all of Colo.; F. Duncan Terry, Meridan, Id.

[73] Assignee: Hewlett-Packard Company, Palo Alto, Calif.

[21] Appl. No.: 459,425

[22] Filed: Jan. 20, 1983

Related U.S. Application Data

[60] Division of Ser. No. 210,462, Nov. 25, 1980, Pat. No. 4,373,193, which is a continuation of Ser. No. 75,787, Sep. 17, 1979, abandoned, which is a division of Ser. No. 828,138, Aug. 29, 1977, abandoned.

[51] Int. Cl.$^3$ .......................... G06F 3/14; G06F 7/00
[52] U.S. Cl. .................................................. 364/900
[58] Field of Search ... 364/200 MS File, 900 MS File; 382/1, 40, 14

[56] References Cited

U.S. PATENT DOCUMENTS

| | | | |
|---|---|---|---|
| 3,406,387 | 10/1968 | Werme | 364/900 |
| 3,457,552 | 7/1969 | Asendorf | 382/14 |
| 3,835,455 | 9/1974 | Abbenante | 364/900 |
| 4,040,025 | 8/1977 | Morrill, Jr. | 364/900 |
| 4,100,532 | 7/1978 | Farnbach | 382/1 |
| 4,192,966 | 3/1980 | Mayer | 382/40 |

OTHER PUBLICATIONS

Operating and Service Manual Supplement—1611A, OPT A68—6800 Microprocessors—Hewlett Packard—HP A68—11611A—Part No. 10257-90907, May 1981.
Operating and Service Manual Supplement—1611A, OPT A60—6800 Microprocessors—Hewlett Packard—Part No. 10258-90905, 8/80.
Service Manual—Logic State Analyzer—1611A—Hewlett Packard—Part No. 01611-90909, Jul. 1980.

Primary Examiner—Harvey E. Springborn
Attorney, Agent, or Firm—Edward L. Miller

[57] ABSTRACT

A logic state analyzer monitors the ongoing succession of states occurring in a collection of digital signals, and stores in a memory either all such states or a selected subset thereof meeting certain qualification criteria. The oldest stored states are overwritten as the newest states are stored. Upon recognition of some trigger condition the logic state analyzer will subsequently store a preselected number of additional states, the collectivity of which may be termed the captured trace. The utility of such a trace in a logic state analyzer is enhanced by equipping the analyzer with a counting mechanism selectively responsive to a high speed clock signal or a programmable state detector. In the former case the counter operates as a timer whose value may represent either the elapsed time between consecutive states in the trace or between each state in the trace and an origin along a time axis. In the latter case the user identifies a state or event of interest and the counter records the number of times that state occurs between the stored states of the trace. In both cases the values of the times or event counts are stored as part of the trace and are displayed in correlated relation to the state data therein.

6 Claims, 16 Drawing Figures

--------FORMAT SPECIFICATION--------TRACE-COMPLETE--------

CLOCK SLOPE [+]
(+,-)

| | POD PROBE | POD4 7------0 | POD3 7------0 | POD2 7------0 | POD1 7------0 |
|---|---|---|---|---|---|
| LABEL ASSIGNMENT (A,B,C,D,E,F,X) | | AAAAAAAA !!!!!!!! | AAAAAAAA !!!!!!!! | DDDDDDDD !!!!!!!! | XXXXXXXF ! |

ACTIVE CHANNELS

LABEL                    A      D      F
LOGIC POLARITY          [+]    [+]    [+]
  (+,-)
NUMERICAL BASE         [HEX]  [HEX]  [BIN]
(BIN,OCT,DEC,HEX)

☐ DESIGNATES A SELECTABLE ENTRY FIELD

FIGURE 1

--------TRACE SPECIFICATION--------TRACE-COMPLETE--------

| | LABEL BASE | A HEX | D HEX | F BIN | OCCUR DEC |
|---|---|---|---|---|---|
| FIND IN SEQUENCE | | 03CF | XX | X | 00002 |
| THEN | | 03E2 | XX | X | 00003 |
| THEN | | 00E1 | XX | X | 00001 |
| [START] TRACE | | 03E3 | XX | X | 00001 |
| SEQ RESTART [ON] | | 03E4 | XX | X | |

TRACE
[ONLY STATE]     03E1    XX    X    00001

COUNT [STATE]    03E1    XX    X

FIGURE 2

--------TRACE LIST--------TRACE-COMPLETE--------

| LABEL BASE | A HEX | D HEX | F HEX | STATE COUNT DEC [REL] |
|---|---|---|---|---|
| SEQUENCE | 03CF | 5D | 0 | |
| SEQUENCE | 03E2 | A2 | 0 | 2 |
| SEQUENCE | 00E1 | C6 | 0 | 3 |
| START | 03E3 | 82 | 0 | 1 |
| +01 | 03E3 | E1 | 0 | 1 |
| +02 | 03E3 | E5 | 0 | 1 |
| +03 | 03E4 | 82 | 0 | 1 |
| +04 | 03E4 | 03 | 0 | 1 |
| +05 | 03E4 | 47 | 0 | 1 |
| +06 | 03E1 | A2 | 0 | 1 |
| +07 | 03E1 | 1D | 0 | 1 |
| +08 | 03E1 | 5D | 0 | 1 |
| +09 | 03CE | 5D | 0 | 1 |
| +10 | 03CE | 44 | 0 | 1 |
| +11 | 03E2 | A2 | 0 | 1 |
| +12 | 03E2 | C2 | 0 | 1 |
| +13 | 03E2 | C6 | 0 | 1 |
| +14 | 00E1 | C6 | 0 | 1 |
| +15 | 03E3 | 82 | 0 | 1 |
| +16 | 03E3 | E1 | 0 | 1 |

FIGURE 3

```
_____TRACE COMPARE_____COMPARED TRACE-COMPLETE_____
       LABEL     A      D    F    COMPARED
       BASE     HEX    HEX  BIN   TRACE MODE
                                   [STOP]
    SEQUENCE...0000...00...0...
    SEQUENCE...0000    00   0
    SEQUENCE   0000    00   0
    START      0000    00   0
      +01   ...0000...00...0...
      +02      0000    00   0
      +03      0000    00   0
      +04      0000    00   0
      +05   ...0000...00...0...
      +06      0000    00   0
      +07      0000    00   0
      +08      0000    00   0
      +09   ...0000...00...0...
      +10      0000    00   0
      +11      0000    00   0
      +12      0000    00   0
      +13   ...0000...00...0...
      +14      0000    00   0
      +15      0000    00   0
      +16      0000    00   0
```

LOGIC STATE ANALYZER WITH TIME AND EVENT COUNT MEASUREMENT BETWEEN STATES

REFERENCE TO RELATED APPLICATIONS

This application is a division of an earlier filed copending application Ser. No. 210,462, filed on Nov. 25 1980 by George H. Haag, et al., and amended to be entitled LOGIC STATE ANALYZER WITH STORAGE QUALIFICATION, now U.S. Pat. No. 4,373,193. That application was a continuation of application Ser. No. 75,787 entitled LOGIC STATE ANALYZER filed Sept. 17 1979 by the same inventors, and which is now abandoned. That application was in turn a division of a now abandoned application of the same inventors and title, Ser. No. 828,138, filed on Aug. 29 1977.

The subject matter of the present application is related to the subject disclosed in U.S. Pat. No. 4,040,025, issued to Justin S. Morrill, Jr., on Aug. 2 1977, and which was filed on Mar. 31 1976.

The subject matter of the present application is also related to the subject disclosed in U.S. Pat. No. 4,100,532, issued to William A. Farnbach on July 11 1978, and which was filed on Nov. 19 1976.

U.S. Pat. Nos. 4,040,025 and 4,100,532 to Morrill, et al. and Farnbach, respectively, are hereby expressly incorporated by reference.

BACKGROUND AND SUMMARY

Logic state analyzers are used to monitor and record sequences of states that occur in a collection of digital signals in a system under test. A "state" is simply any one of the $2^n$ logical patterns that n-many digital signals may experience. A sequence of addresses or a sequence of fetched instructions are examples of electrical activity describable as states in a microprocessing environment and that can be monitored by a logic state analyzer to record their "state flow."

To monitor the ongoing sequence of states in a system under test a logic state analyzer samples the electrical values of the signals of interest at times determined by one or more clock signals associated with the system under test. The sampled electrical values obtained are compared to thresholds of selected value and polarity to determine their logical values, each of which will be either true or false, one or zero. Each resulting collection of ones and zeros for a sample is a state in the ongoing sequence of states. It is also simply a binary value that may be stored in a memory. A series of such stored values is a record of the activity occurring in the system under test. Such a record may be termed a trace.

It can be useful for a trace to contain other information besides a simple list of states in the order they occurred. For example, it may be very useful to know the elapsed time between the states in the trace, or, perhaps the time between each state and an origin on a time axis. It can also be useful to know how many times some selected event occurred between each pair of consecutive states in the trace.

These additional data may be obtained by equipping a logic state analyzer with a counter connectable to a high speed clock signal for time measurements and connectable to a programmable state detection mechanism for event counts. Each time a state is stored as part of the trace the associated count is stored as well. The output form of the trace (display, printed table, etc.) includes the time or count information for each state in the trace.

DESCRIPTION OF THE FIGURES

FIG. 1 illustrates the interactive format specification display.

FIG. 2 illustrates the interactive trace specification display.

FIG. 3 illustrates a trace list display of the stored data states.

FORMAT SPECIFICATION

Data formatting permits the partitioning of 32 input data channels into parameters of interest. Contiguous channels which behave as a single parameter may be assigned to one of six labels (A-F). For example, in FIG. 1, illustrating the interactive format specification display, 16 bits of an address bus have been assigned to label "A", 8 bits of a data bus have been assigned to label "D", 1 bit of data on pod 1 has been assigned to label "F", and 7 bits have been left unassigned (labeled "X"). Further specifications and data manipulations are made by referencing these labels. Each assigned label may be independently declared to have a positive or negative "logic polarity" and converted to an independently selected radix which can be binary, octal, decimal or hexedecimal. Further, the slope of the positive or negative clock transition at which time the input data channels are sampled can be selected ("clock slope").

Figure 15:
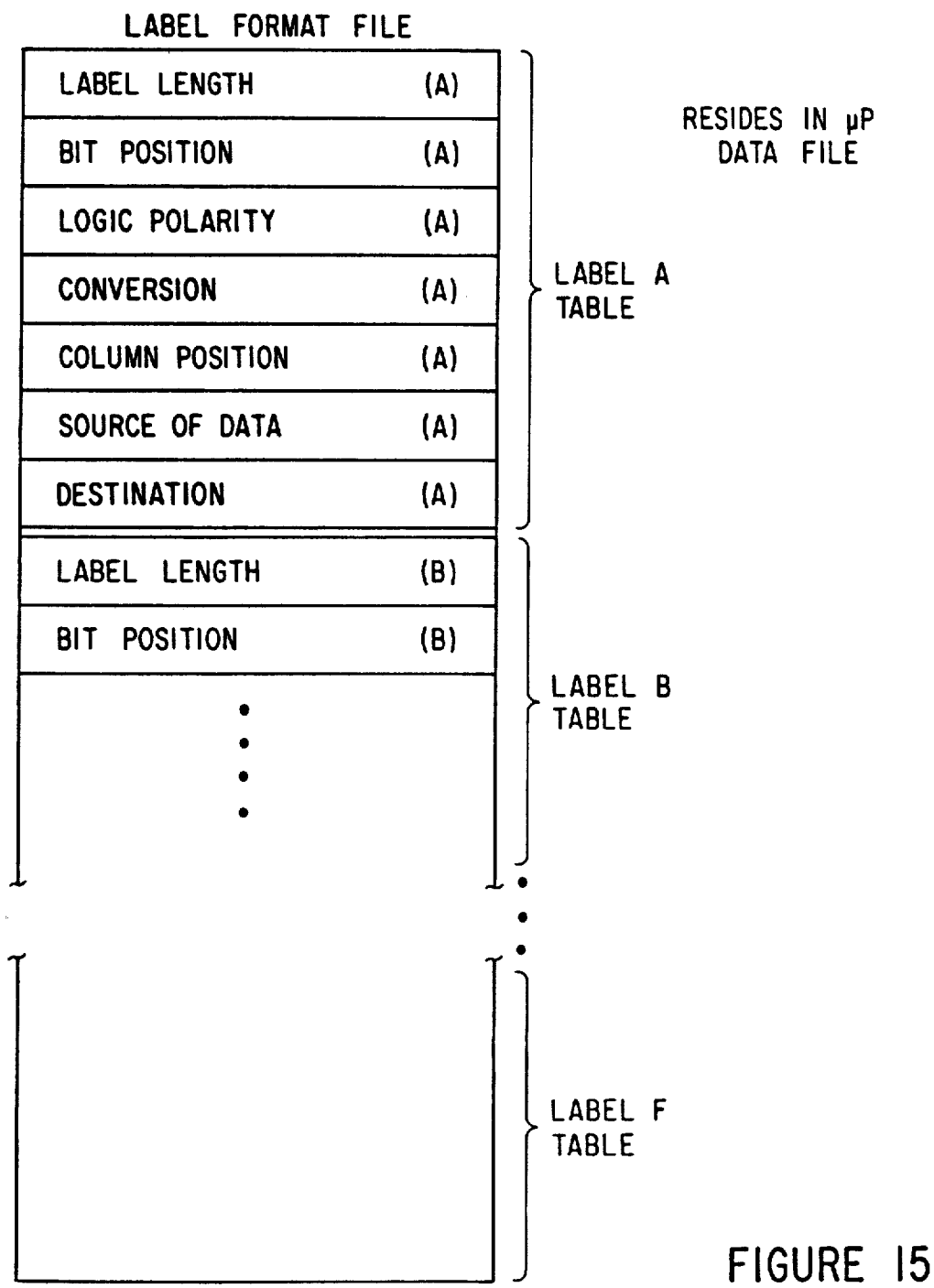
FIG. 15 illustrates the format of the label format file.
Figure 16:
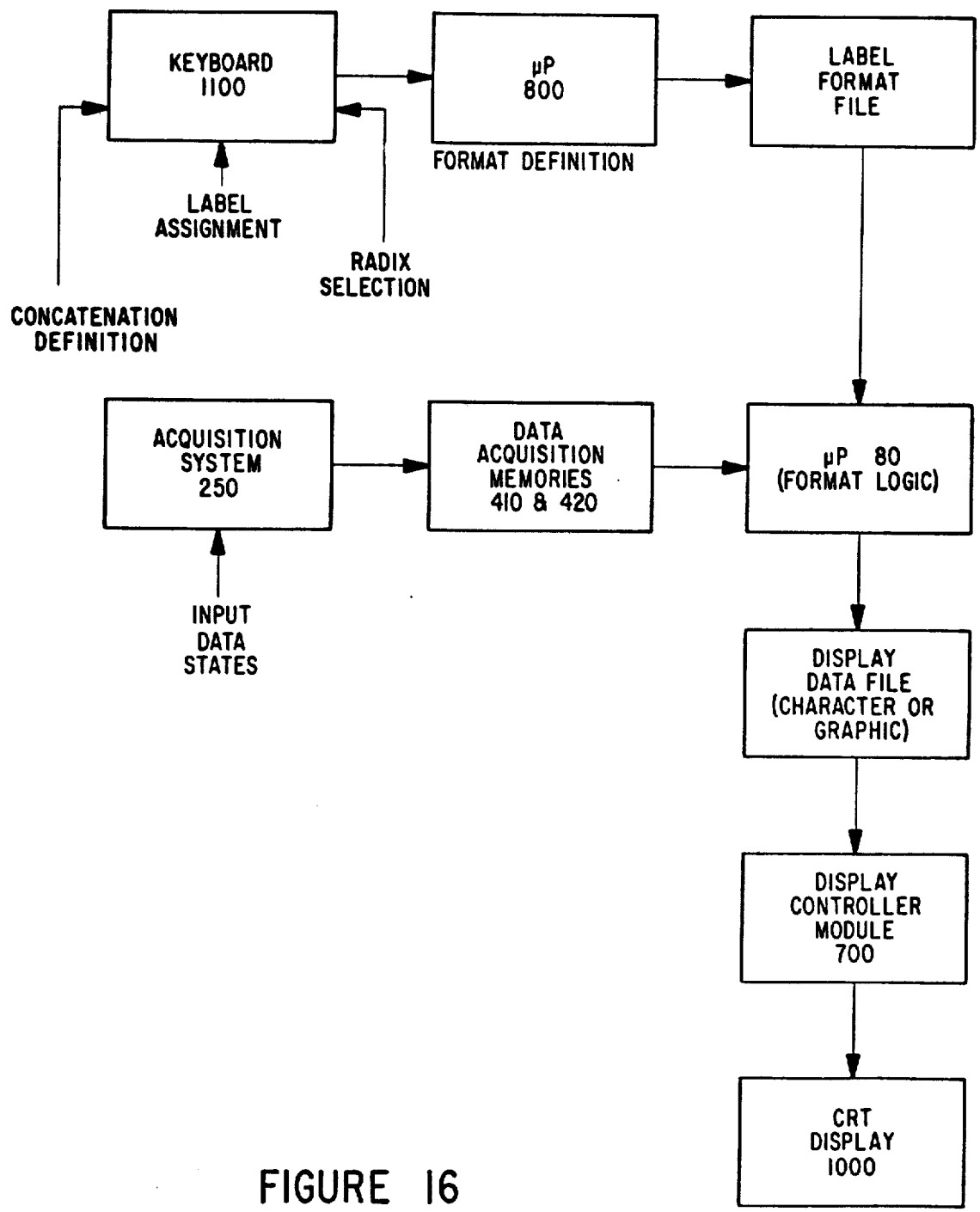
FIG. 16 illustrates the logic flow of the display formatting logic.

Keyboard entries to the microprocessor 800, as shown in FIG. 16, permit the construction of the label format file, shown in more detail in FIG. 15 which, contains the format specification parameters. This is used to process the stored data states in the construction of the alphabetically cancatenated ASCII display data file and the graphic display data file. Either of the display data files is subsequently selected and used for display purposes by the display control module 700 and the CRT display 1000.

Trace Specification

The assigned input data channels are sampled at the specified clock transitions and are treated as one sampled state. The trace specification defines which of the sampled states are to be stored for display and which sampled states are to be counted for count measurements. The trace specification comprises a definition of state conditions specifying the trace position, the selective trace, and the count measurement. Each state condition defines a state of the assigned input data channels in any combination of 1's, 0's, and/or X's (don't care). In octal, decimal or hexedecimal bases the definition is defined in terms of the appropriate alphamumerics and X's.

A trace position may be selected to a start, center or end the selective trace in response to the input data satisfying a predefined state sequence. In this description it will be assumed that the trace position starts the selective trace. A state sequence of up to seven state conditions must be satisfied in a specified order, ignoring intermediate states which do not satisfy the state sequence. The simplest state sequence is a single state condition. Specific segments of branched, looped or nested forms of state flow may be directly located by properly defined state sequences. In addition, each state condition in a state sequence may be required to occur from 1 to 65536 times before the state condition is satisfied. This form of positioning will locate the nth pass of a loop beginning at a given state condition. Clock delay may be incorporated by defining the nth occurrence of any state (an all don't care state specification). The trace logic may also be specified to restart the satisfaction of the predefined state sequence if it is not satisfied before or concurrently with the location of a predefined restart state condition. A restart on "any state" requires that the state sequence be satisfied without any unspecified intermediate states. For example, FIG. 2 illustrates the interactive trace specification display for a trace position starting upon the satisfaction of 4 state conditions in sequence. A restart state condition is also defined.

The selective trace is a qualification to determine which sampled states will be stored for display. One to seven state conditions may be "OR" specified for collection. Selectively tracing only sampled states of interest eliminates the clutter of unneccessary states and magnifies the apparent size of the trace beyond its 64 terms. Also, an occurrence term may be specified so as to store only every nth satisfaction of an "OR" specified state condition. FIG. 2 illustrates the selective trace of every occurrence of a single state condition.

The count measurement performs a "time" or a "state" count associated with each of the (64) states stored and can be displayed in one of two formats:

absolute—the count from the trace position relative—the count from the previous trace state The time count is performed by counting the occurrences of an internal clock between sequentially stored states and the display is in the units of seconds. A state count similarly counts the number of occurrences of a specified state condition ("count") between sequentially stored states. For example, specifying "any state" would result in a count of the selected clock transitions of the input data. In FIG. 2, a state count is performed on the occurrences of a specified state condition intermediate to each sampled state stored.

Internal Measurement Storage

One complete measurement of 64 sampled states, which includes the sampled states satisfying the state conditions defining the state sequence and specifications of the format, trace, and display, may be internally stored. This "current measurement" may be stored or exchanged with a "stored measurement" for later analysis. A "trace compare" mode of operation (described more fully below) compares results of a previously stored trace with the current measurement and may be utilized as a further qualifier on data storage.

Display Specification

The output display format of the current measurement may be selected from a trace list, a trace graph, or a trace compare.

A trace list, illustrated in FIG. 3, displays a listing of the stored states in their order of occurrence. Twenty trace states, (one per line) are simultaneously presented on the CRT display. The "ROLL" keys allow scanning of the 64 stored states. Each line comprises a line number, the stored state alphabetically sorted into assigned labels in their numerical base, and the time or state count if selected.

Figures 4, 5:
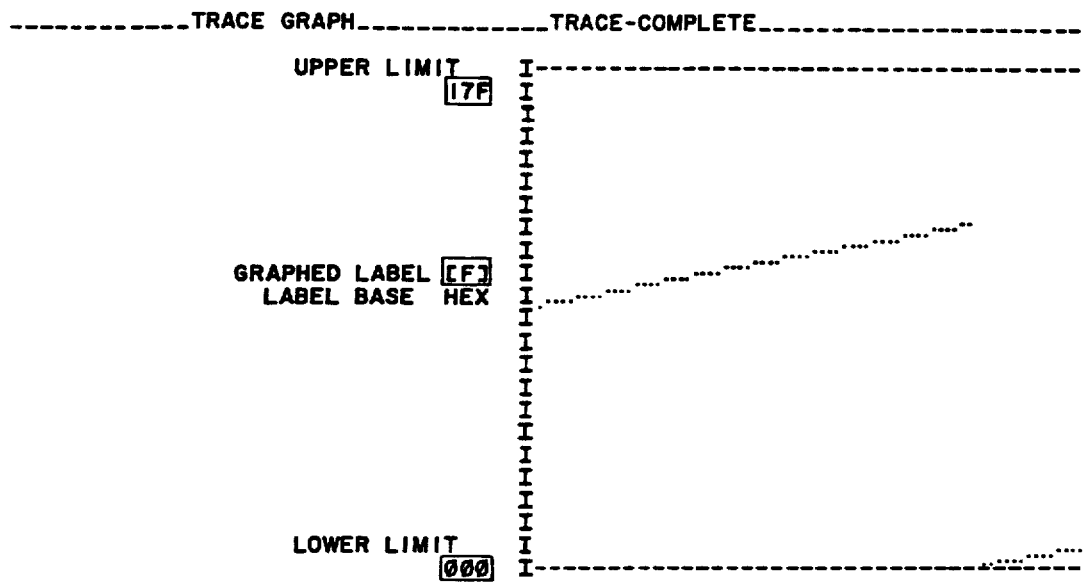
FIG. 4 illustrates a trace graph display of the stored data states.
FIG. 5 illustrates a trace compare output display list.

A trace graph, as shown in FIG. 4, presents a graph of the data magnitude of a specified label versus the storage location for all 64 stored states. Each state is given a vertical displacement corresponding to its binary magnitude and an increasing horizontal displacement for successive states in order of their occurrence. The result is a waveform analogous to oscilloscope displays of voltage magnitude. The label to be graphed is selected by specifying the "graphed label". Scaling of state magnitude is controlled by specifying the "upper limit" and "lower limit" on the vertical axis. Limits can be specified directly or dynamically varied with logrithmic autoranging controls. These facilities allow any portion of a graph to be magnified to a full scale presentation. The 20 points corresponding to the lines viewed in the trace list are intensified. The intensified poriton also responds to the "ROLL" controls, and their corresponding absolute value may be read in the trace list.

A trace compare as illustrated in FIG. 5 presents a tabular listing of the difference between results in the "current measurement" and the data in the "stored measurement". The listing is formatted and rolled as in the trace list. The results of the two measurements are exclusive "OR'ed" such that identical corresponding bits are displayed as zeros and unequal bits are displayed as ones. In an octal base a "∅3" is equivalent to a binary "∅∅∅ ∅11" and indicates that the right two bits are different in the two measurements. Trace compare also offers a "compared trace" mode which reruns a measurement until the current and stored measurement are either equal or not equal. (STOP=, or STOP ≠) For example, in FIG. 5 of the instrument has rerun trace measurements until the "current measurement" equaled the "stored measurement", as indicated by the "STOP=" specification and revealed by the array of "0"'s in the comparison.

TRACE MODES

Three trace mode options are provided. "Trace" executes a single current measurement. "Continuous trace" repeats the execution of a current measurement continuously. "Compared trace" repeats the execution of a current measurement until the desired comparison with the stored measurement is obtained.

CLOCK ENABLE AND TRIGGER OUTPUTS

A trigger output provides a triggering pulse for external instrumentation such as oscilloscopes. A 50 ns pulse is generated each time the trace position is found. The clock enable output is useful for gating clocks or interrupting the device under test. A high signal level indicates that the instrument is actively searching for the trace position. It remains at the high signal level until the trace position has been found or the halt key is depressed. Both outputs are suspended when the format specification is displayed to allow measurement of channel activity.

KEYBOARD AND SPECIFICATION DESIGNATION

Figure 6:
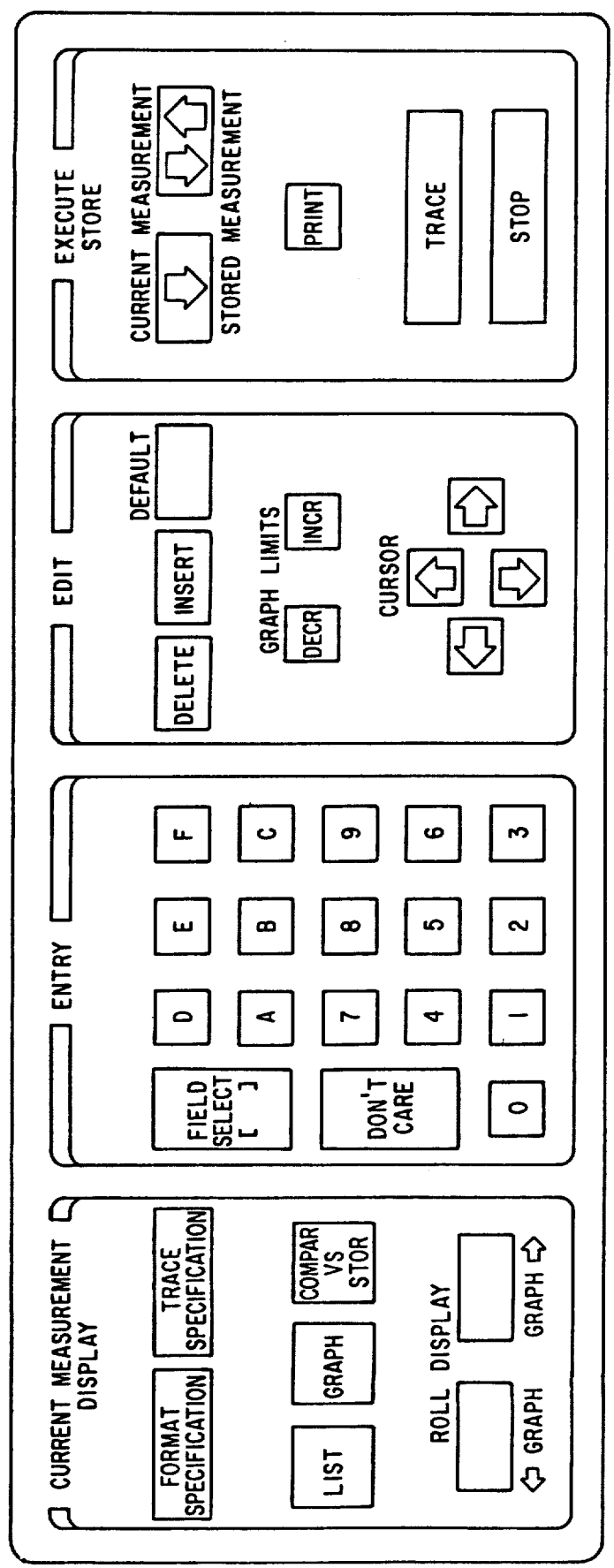
FIG. 6 illustrates the input keyboard.

Referring to FIG. 6, an illustration of the keyboard, the keys are functionally segregated into four blocks, the "current measurement display", "entry", "edit", and "execute". A power up sequence initially defines a default set of specifications, displays the default format specification, then automatically selects a hexadecimal trace list display. Activation of the "ROLL DISPLAY" keys permits the presentation of any portion of the 64 states stored. To change the format specification, the "FORMAT SPECIFICATION" key is pressed. The cursor keys in the edit block are used to move the cursor, designating a selectable entry field by a blinking inverse video field on the interactive display.

The trace specification can be edited by selecting the trace specification interactive display by activating the "trace specification" key. Editing is accomplished in the same manner as the format specification is edited. A general description of the functions of the individual keys is given in Appendix A. A detailed description of the interactive display entry fields is given in Appendix B.

DETAILED DESCRIPTION

Figure 7:
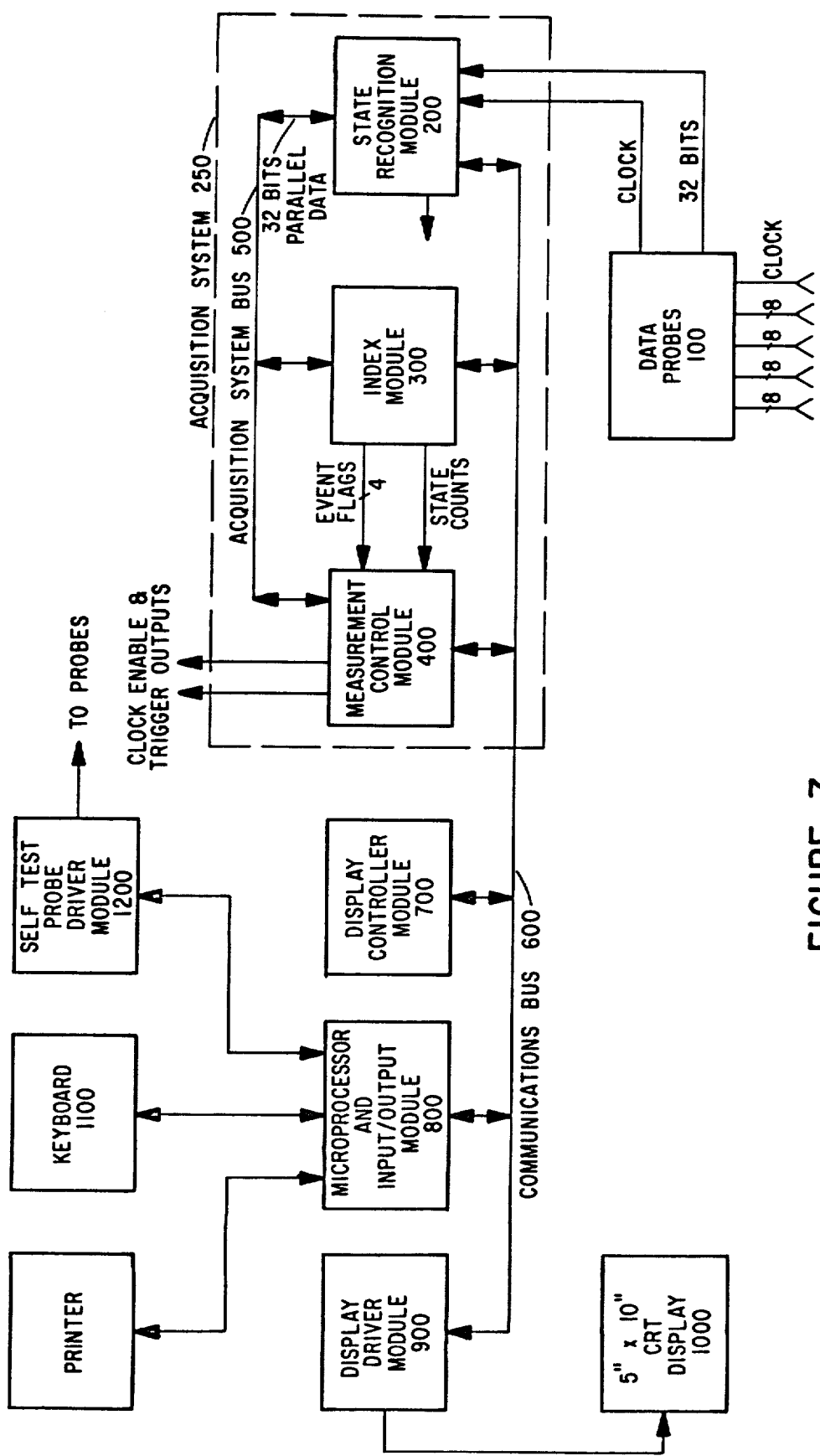
FIG. 7 illustrates a block diagram of the present invention.

Input states are sensed through 32 high impedance variable threshold data probes at rates up to 10 MHz. The data probes 100, illustrated in FIG. 7, are segmented into four 8 bit data pods and a fifth pod for clock sensing. Each pod may be preset to TTL logic threshold or variably adjusted in the range of +10 to −10 volts to interpret input logic levels.

The 32 input data channels and the clock signal from the data probes 100 are input to the state recognition module 200. An internal sampling clock is generated in response to the selected clock slope, the input data signals are compared to the selected threshold voltages and interpreted, and the data signals are latched in response to occurrences of the internal sampling clock. The state recognition module 200 outputs the sampled state to the high speed acquisition system bus 500. The index module 300 accesses the sampled state on the acquisition system bus 500, compares the sampled state to the selected state conditions and determines the trace position, selective storage events and state count events. The measurement control module 400 also accesses the acquisition system bus 500 and stores state or time counts and sampled data states in response to the events detected by the index module 300.

Figure 8:
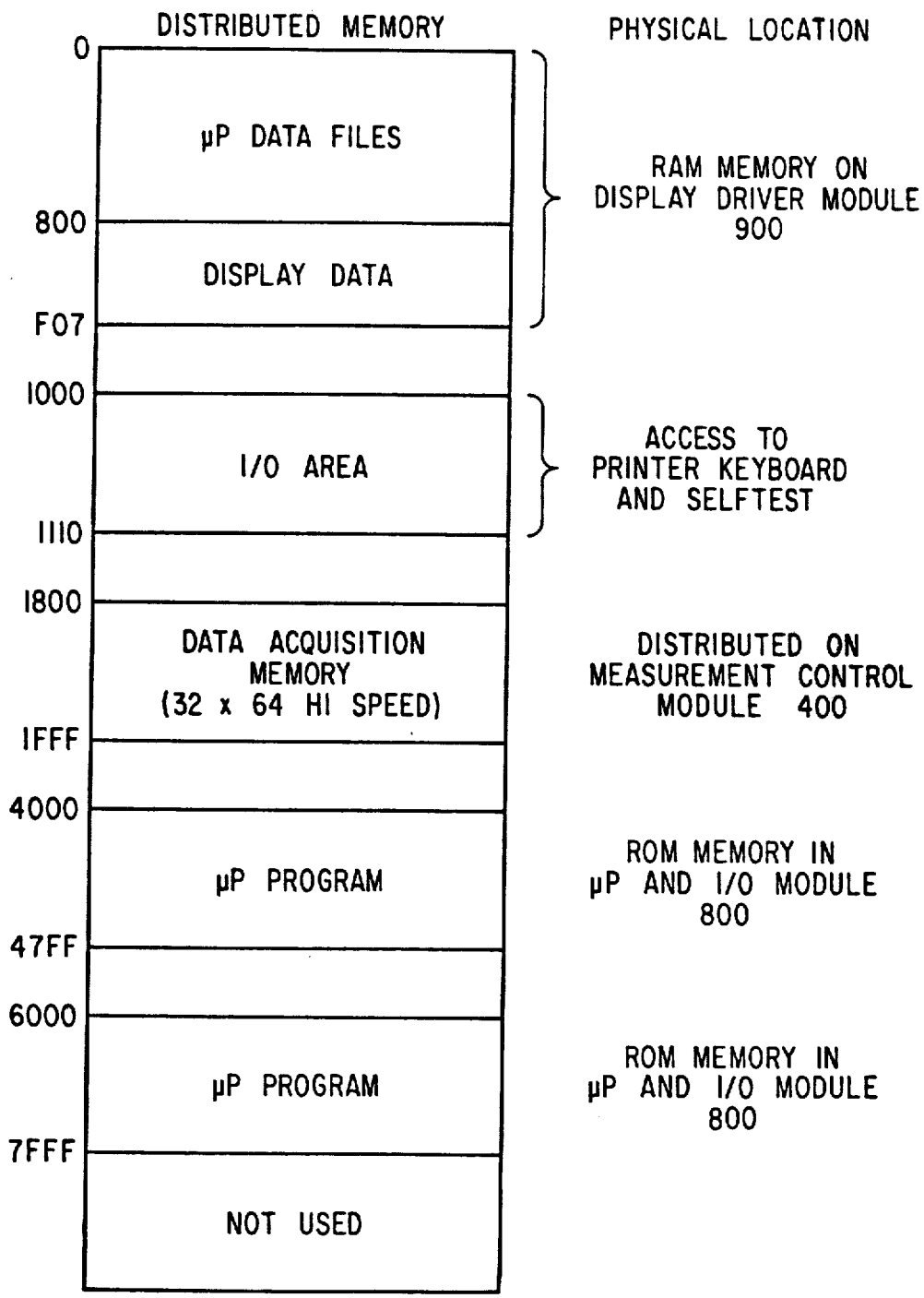
FIG. 8 illustrates the distributed memory addressing of the present invention.
Figure 9:
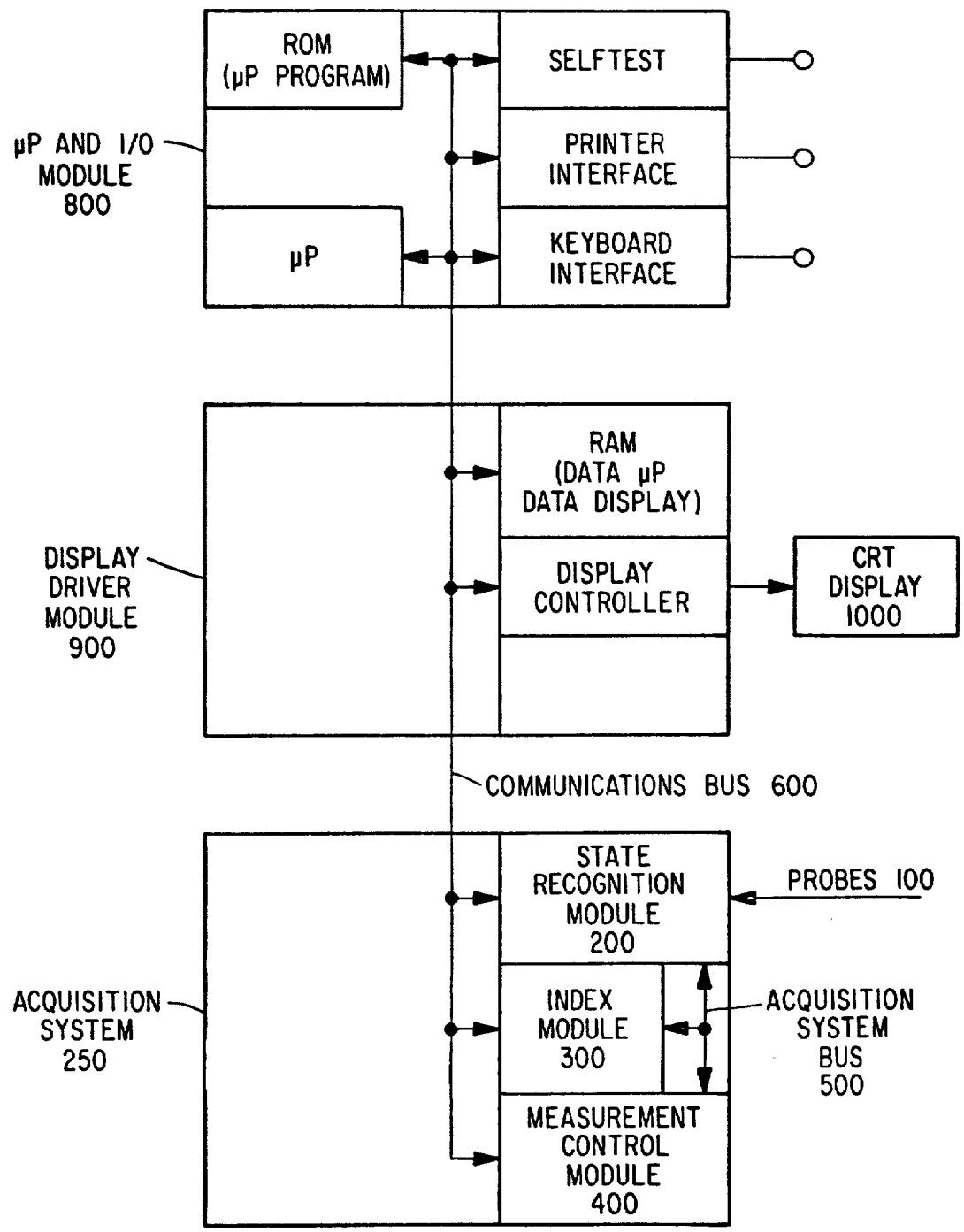
FIG. 9 illustrates the relationship between physical and logical addresses of the distributed memory of FIG. 8.

The modules of the acquisition system 250 communicate with other system modules via the communications bus 600, which provides a means for addressing selected modules and for transferring selected data. The entire system functions as a distributed memory, as illustrated in FIG. 8. For instance, addresses between 1800 and 1FFF on the communications bus 600 access the state count measurements and the sampled data states stored in the measurement control module 400 memories. FIG. 9 shows another representation of the system architecture, illustrating the relationship between the physical couplings of FIG. 7 and the logical addresses of FIG. 8.

Figure 10:
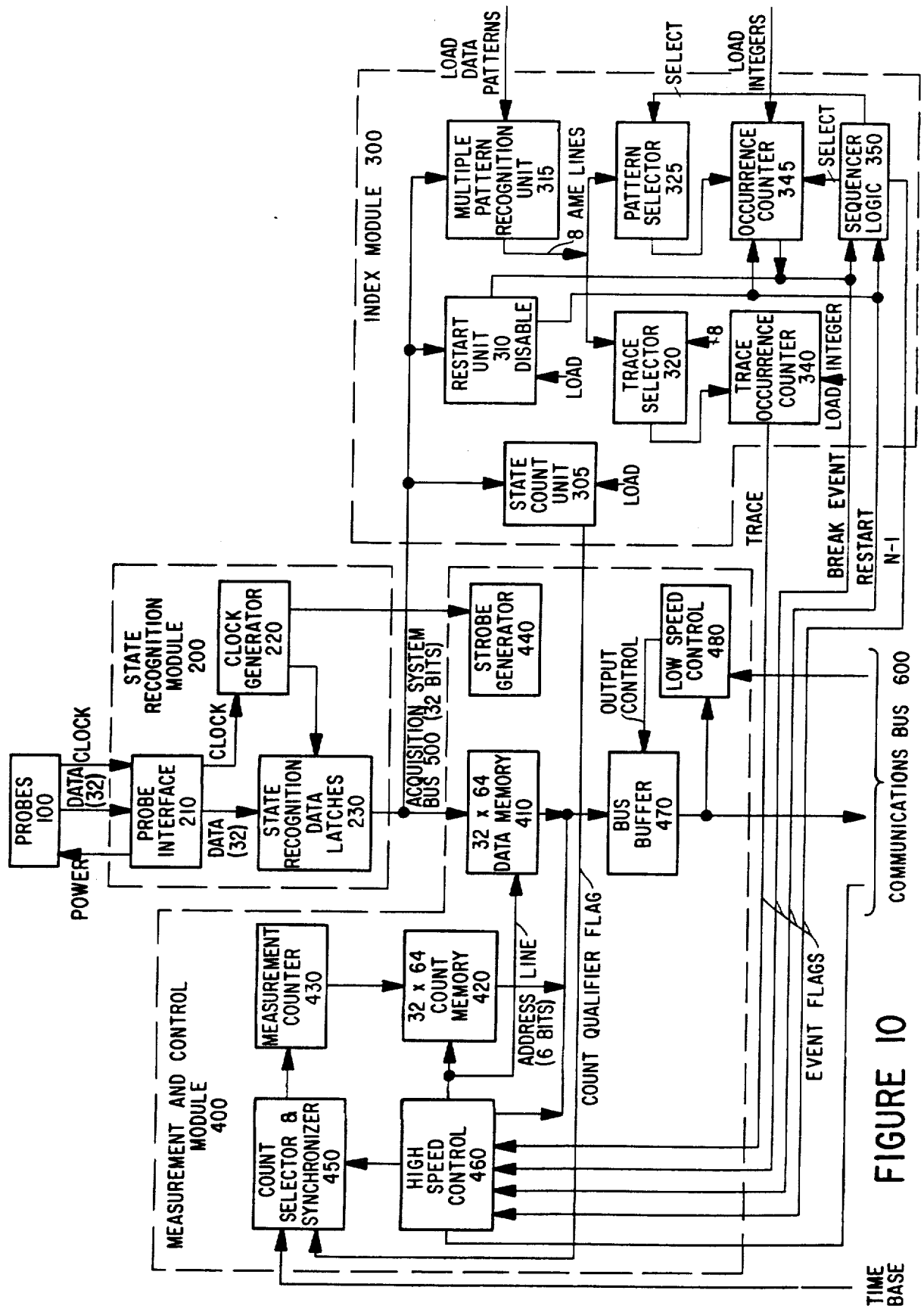
FIG. 10 is a block diagram of the acquisition system.
Figure 11:
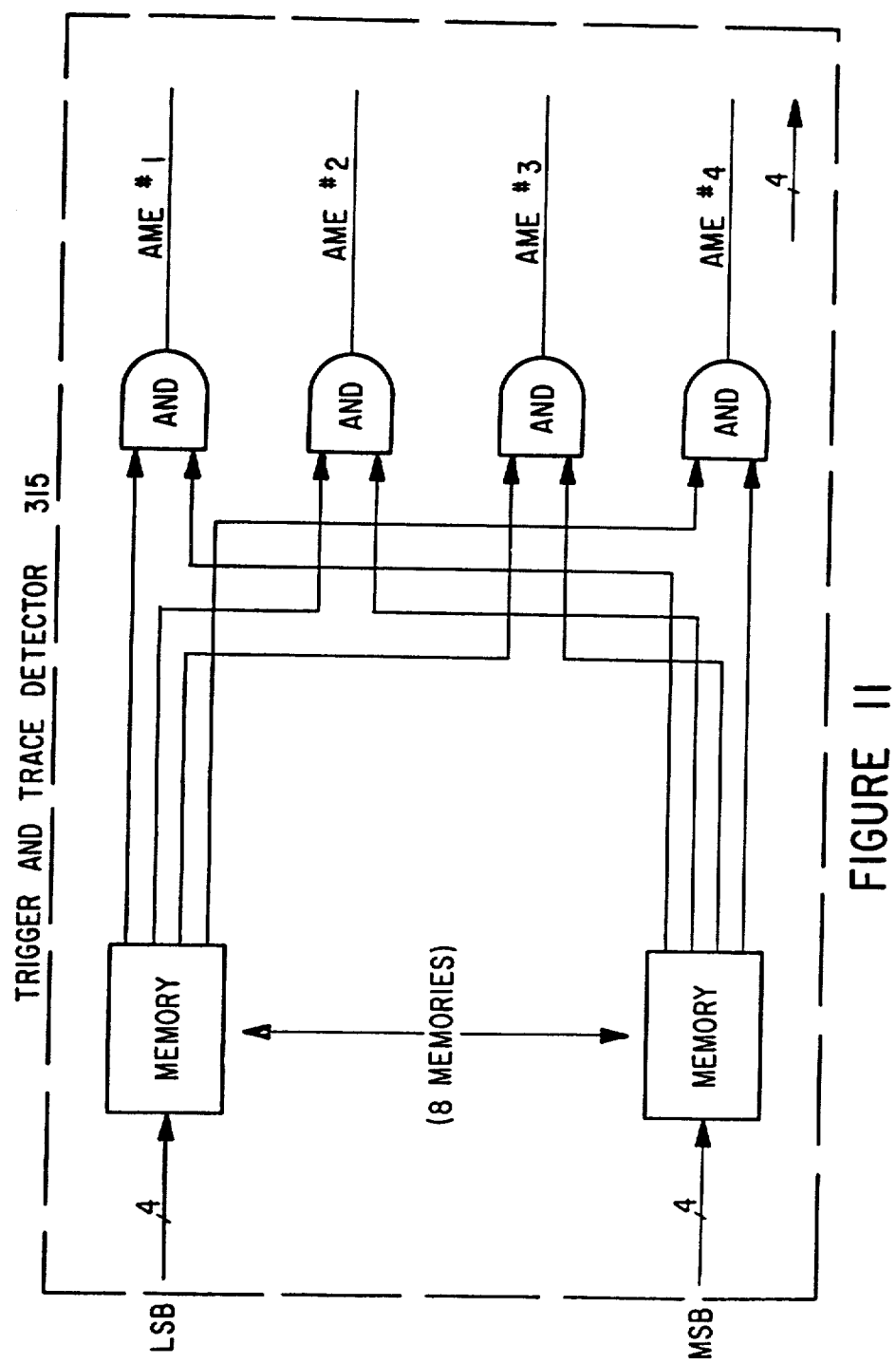
FIG. 11 illustrates a multiple pattern recognition unit.
Figure 12:
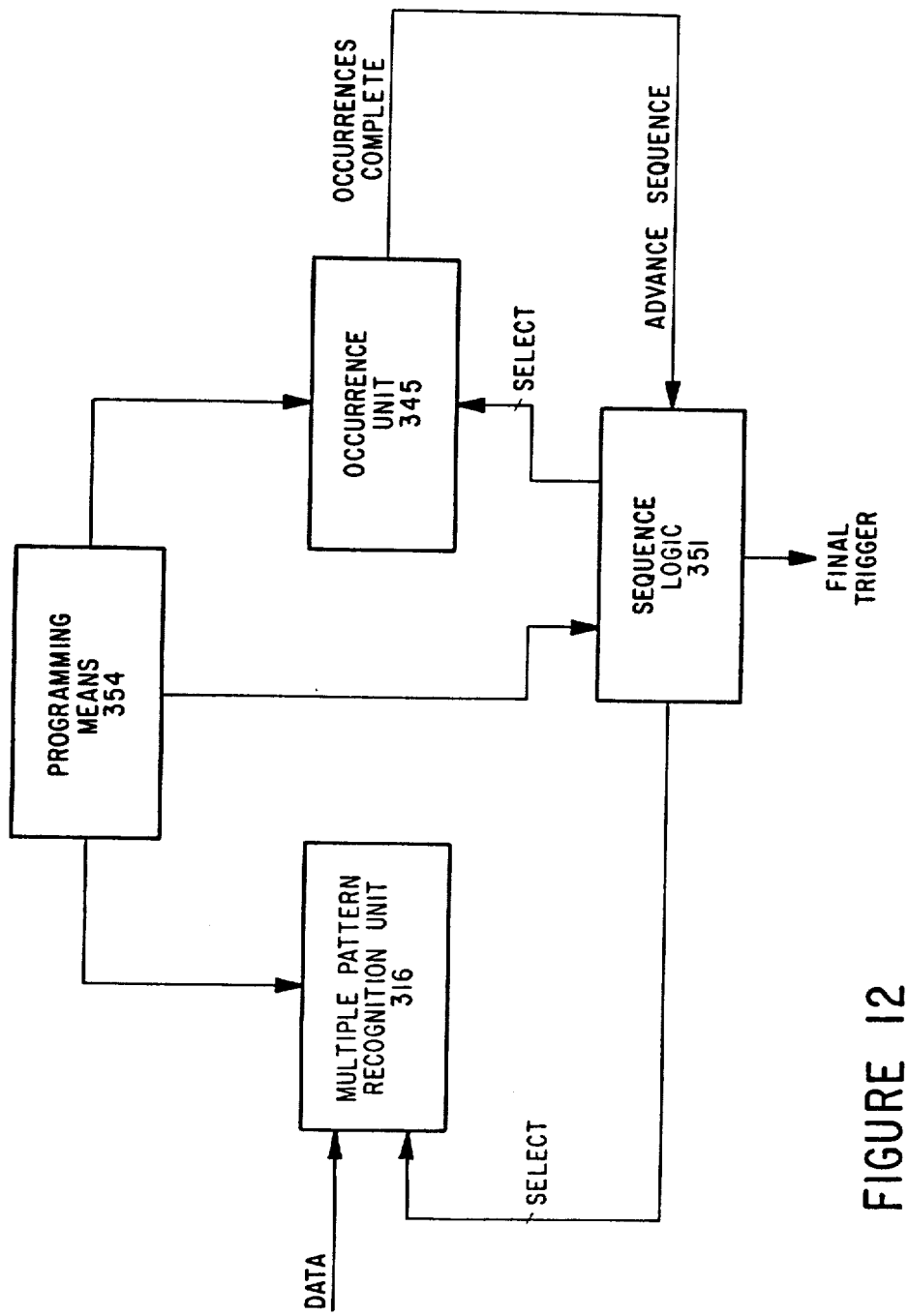
FIG. 12 illustrates a simplified sequential triggering circuit.

Referring to FIG. 10, the index module 300 detects the trace position by first comparing the sampled state on the acquisition system bus 500 with a qualifier state condition stored in the multiple pattern recognition unit 315. The multiple pattern recognition unit 315 comprises a digital pattern triggering circuit as described in the copending patent application entitled "DIGITAL PATTERN TRIGGERING CIRCUIT", U.S. Patent application No. 743,188 (and now issued as U.S. Pat. No. 4,100,532) filed November 19, 1976, by WILLIAM A. FARNBACH. As illustrated in FIG. 11, the multiple pattern recognition unit 315 comprises 2 pairs of 8 sixteen by four bit memories providing for the detection of up to eight qualifier state conditions, where each qualifier state condition is identified by a 1, 0, X input, format (in binary). Pattern selector 325 of FIG. 10 selects one of the eight lines output from the multiple pattern recognition unit and passes the selected output to the occurrence counter 345. The occurrence counter 345 counts the occurrences of the selected qualifier state conditions and provides an output in response to counting a specified number of occurrences of the selected qualifier state condition. This output is termed a "break event" and the sequencer logic 350 in response requests the pattern selector 325 to select the next sequential qualifier state condition and requests the occurrence counter 345 to select the corresponding count. The sequencer logic 350 also outputs a "N-1" event flag in response to detection of the occurrence of the "NEXT TO LAST BREAK EVENT". A simplified sequential triggering circuit is illustrated in FIG. 12 where the multiple pattern recognition unit 316 incorporates the functions of the multiple pattern recognition unit 315 and of the pattern selector 325. The sequence logic 351 incorporates the functions of the sequence logic 350 except that the final trigger is output in response to the completion of the state sequence. Another method of implementing the multiple pattern recognition unit 316 would be to have 3 selector bits be the most significant bits in the address, allowing the comparator to sequence through various segments of memory when comparing sequential state conditions of the state sequence.

Referring again to FIG. 10, the selective trace is incorporated in a similar manner except that the trace selector 320 of FIG. 10 can "OR" any combination of the AME lines. A trace occurrence counter 340 outputs a trace event flag upon counting each "nth" "ORED" AME event.

The restart unit 310 causes the sequence logic 350 to restart the satisfaction of the state sequence subsequent to the detection of a selected restart state condition. The restart unit is disabled for the data state corresponding to the detection of a break event by sequencer logic 350 which permits the state sequence to be satisfied without any unspecified intermediate state by setting the restart state condition to "any state".

The state count unit 305 strobes a counter in the measurement control module 400 each time the selected state condition to be counted is detected.

Figure 13:
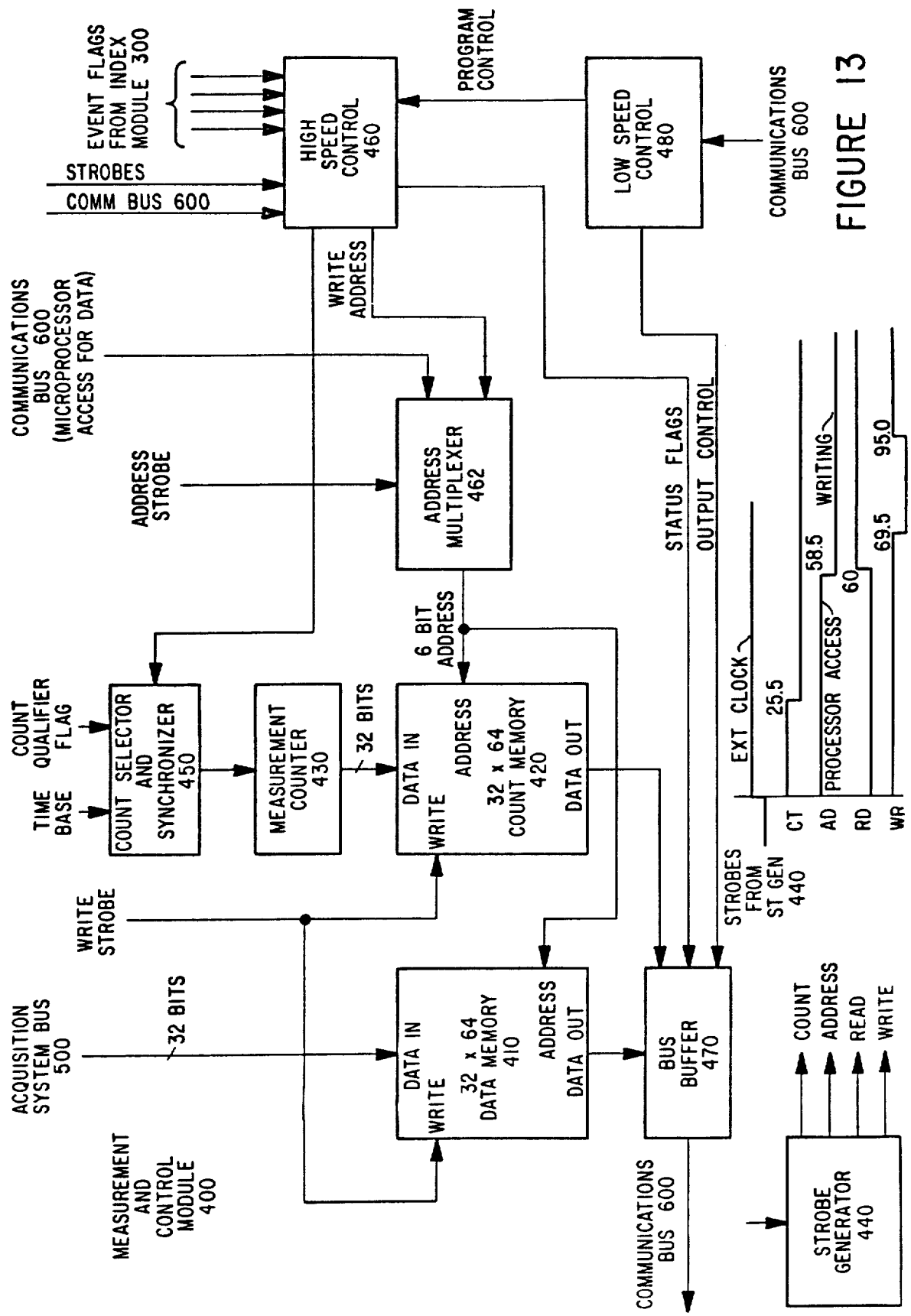
FIG. 13 illustrates the measurement and control module.
Figure 14:
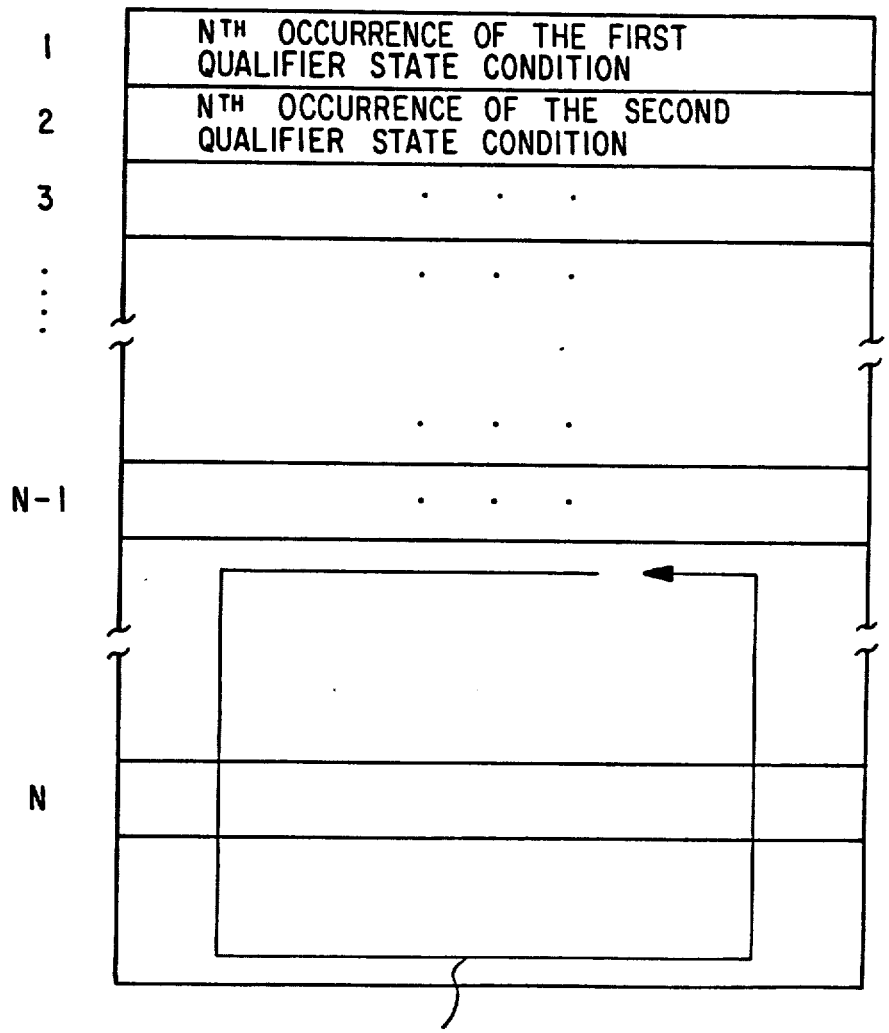
FIG. 14 illustrates the data format of the data memory.

The measurement and control module 400 is illustrated in FIGS. 10 and 13. The event flags from index module 300 are input to the high speed control 460 and determine which sampled states on the acquisition system bus 500 are to be stored. The high speed control 460 addresses the data memory 410 and the count memory 420 accordingly. FIG. 14 illustrates the data format of the data memory 410. The sampled state conditions resulting in break events are sequentially stored in locations 1-(N-1). Upon detection of the "N-1" event flag, sampled state conditions are sequentially written into the remaining memory locations, writing over the oldest data when the memory is filled. The trace position address of the memory location containing the state condition resulting in the final trigger is stored in a register and sampled states are written into the appropriate number of remaining storage locations. For example, if the trace was defined to end on the detection of the trace portion, no sampled states would be written subsequent to the detection of the trace position. The order of occurrence of the stored data is easily reconstructed by recovery of the trace position address appearing on the communications bus 600 as illustrated in FIG. 8. Count selector and synchronizer 450 controls the measurement counter 430, whose contents are stored in count memory 420 upon update of the memory address. The low speed control 480 provides a low speed interface for programming the high speed control 460 and for selecting and latching data for the communications bus 600 interface.

The strobe generator 400, illustrated in FIGS. 10 and 13, generates a sequence of strobes which, when coupled with a series of data latches (not shown) and timing logic (not shown) effectuate the orderly performance of machine tasks. In effect, a number of sampled states are simultaneously in various stages of processing at any one time and are "pipelined" through the required logic blocks.

APPENDIX A

GENERAL DESCRIPTION -- KEYBOARD

CURRENT MEASUREMENT DISPLAY

LINES 3 THROUGH 24 ARE DEPENDENT ON THE DISPLAYED MENU CHOSEN, WHICH MAY BE SELECTED BY KEYS IN CURRENT MEASUREMENT BLOCK:

| | |
|---|---|
| FORMAT SPECIFICATION | SELECT CLOCK SLOPE AND FORMAT 32 CHANNELS INTO LOGICAL LABELS, DESIRED LOGIC POLARITY AND NUMERICAL BASE. |
| TRACE SPECIFICATION | DEFINE TRACE POSITION, SELECTIVE TRACE AND COUNT MEASUREMENT. |
| LIST | DISPLAY RESULTANT CURRENT TRACE AND COUNT DATA. |
| GRAPH | GRAPH RESULTANT CURRENT TRACE DATA FOR SELECTED LABEL. THE 20 INTENSIFIED DOTS CORRESPOND TO TRACE LIST DATA. |
| COMPARE VS STORE | DISPLAY THE "EXCLUSIVE OR" OF VALID CURRENT DATA WITH VALID STORED DATA, AND SELECT COMPARED TRACE MODE. |
| ROLL DISPLAY ← GRAPH    GRAPH → | VIEW TRACE LIST OR TRACE COMPARE DATA. TRACE GRAPH SHOWS INTENSIFIED DOTS THAT REPRESENT THE TRACE LIST DATA DISPLAYED. |

ENTRY

ALL PROGRAM ENTRIES ARE MADE IN INVERSE VIDEO FIELDS AT THE BLINKING CURSOR, AND MAY BE CHANGED BY THE ENTRY BLOCK OF KEYS:

| | |
|---|---|
| FIELD SELECT [ ] | ALL FIELDS ENCLOSED WITH BRACKETS [ ] ARE CHANGED BY THIS KEY. THE 1610A SELECTS ONLY ALLOWED CHOICES. |
| 0-9, A-F, X | ALL OTHER FIELDS MAY BE CHANGED USING THESE KEYS. |

APPENDIX A

GENERAL DESCRIPTION -- KEYBOARD (CONT'D)

EDIT

DISPLAYED MENUS MAY BE EDITED BY THE EDIT BLOCK OF KEYS:

| | |
|---|---|
| DELETE   INSERT | USED IN THE TRACE SPECIFICATION MENU ONLY TO OPTIONALLY DELETE OR INSERT STATES TO SPECIFY TRACE POSITION AND SELECTIVE TRACE. A MAXIMUM OF 8 STATES MAY BE USED BETWEEN TRACE POSITION AND SELECTIVE TRACE. |
| DEFAULT | RETURNS THE DISPLAYED MENU TO A KNOWN (PRESET, TRACEABLE) CONDITION. |
| INCR   DECR | USED IN TRACE GRAPH ONLY TO AUTOMATICALLY CHANGE UPPER OR LOWER GRAPH LIMITS. |
| ← ↑ ↓ → | USED TO MOVE THE BLINKING CURSOR TO A DESIRED FIELD. |

EXECUTE

THE REMAINING KEYS ARE THE EXECUTE BLOCK OF KEYS:

| | |
|---|---|
| CURRENT MEASUREMENT  STORED MEASUREMENT | ↓ KEY SAVES CURRENT SPECIFICATION AND DATA MEASUREMENT IN A STORED FILE. THE CURRENT SPECIFICATION AND DATA REMAIN UNCHANGED.  ↓↑ KEY EXCHANGES THE CURRENT AND STORED MEASUREMENT FILES. |
| PRINT | PRINTS THE CURRENT DISPLAY, EXCEPT TRACE GRAPH, ON AN HP 9866 LINE PRINTER. TRACE LIST AND TRACE COMPARE WILL PRINT THE CURRENT PAGE AND ANY REMAINING DATA IN MEMORY. |
| TRACE | EXECUTES THE CURRENT SPECIFICATION, AND IF DISPLAY IS THE FORMAT OR TRACE SPECIFICATION, THE 1610A SWITCHES THE DISPLAY TO TRACE LIST.  IF TRACE IS HELD DOWN, THE MEASUREMENT IS TRACED CONTINUOUSLY.  IF THE COMPARE TRACE MODE IS SET FOR [STOP=] OR [STOP#] THE MEASUREMENT IS TRACED UNTIL THE CONDITION IS MET. THE INSTRUMENT STATUS (1ST LINE) IS EITHER "COMPARED TRACE-FAILED", (IMPLIES CONDITION NOT MET) OR "COMPARED TRACE-COMPLETE" (IMPLIES CONDITION MET). |
| STOP | STOPS ANY MEASUREMENT TRACE, COMPARED TRACE OR PRINT IN PROCESS. |

APPENDIX B

DETAILED FIELD(S) DESCRIPTION

CLOCK SLOPE:

EXAMPLES:   CLOCK SLOPE [+]
              CLOCK SLOPE [-]

PURPOSE:   TO SELECT THE CLOCK TRANSITION USED TO STROBE POD DATA INTO THE 1610A.

LABEL ASSIGNMENT AND ACTIVE CHANNELS:

```
EXAMPLE:    POD4       POD3       POD2       POD1
            7------0   7------0   7------0   7------0
            AAAAAAAA   AAAAAAAA   DDDDDDDD   XXXXXXXF
            !!!!!!!!   !!!!!!!!   !!!!!!!!          !
                          ACTIVE CHANNELS
```

PURPOSE:   TO ASSIGN LABELS A,B,C,D,E OR F TO ANY NUMBER OF CONTINUOUS CHANNELS INDEPENDENT OF POD BOUNDARIES. IN THE ABOVE EXAMPLE THE LABEL A IS ASSIGNED TO 16 BITS OF POD3 AND POD4, AND MAY REPRESENT A 16 BIT ADDRESS. LABEL D IS ASSIGNED 8 BITS ON POD2 AND MAY REPRESENT AN 8 BIT DATA BUS. LABEL F IS A SINGLE BIT QUALIFIER (READ/WRITE) AND IS ASSIGNED TO THE LEAST SIGNIFICANT BIT ON POD1.

ANY UNUSED CHANNELS MAY BE TURNED OFF BY PUTTING AN "X" IN THOSE CHANNELS.

COMMENT:   AS MANY AS SIX LABELS OR AS FEW AS ONE MAY BE ASSIGNED ACROSS THE 32 CHANNELS. IF A LABEL IS SPLIT, SUCH AS

AABBBAAA      (LABEL IS NOT CONTINUOUS)

THEN AN ERROR MESSAGE "ERROR-SPLIT LABEL" IS DISPLAYED AND THE CURSOR IS LOCKED TO THE LABEL ASSIGNMENT FIELDS UNTIL THE ERROR IS CORRECTED.

PRESSING THE DEFAULT KEY WILL ASSIGN LABEL F TO ALL 32 CHANNELS.

ACTIVE CHANNELS ARE SHOWN BY "!" MARKS FOR EACH ASSIGNED CHANNEL. ABSENCE OF "!" INDICATES LOW CHANNEL (BIT) ACTIVITY, AND IS A GOOD INDICATOR THAT A POD CLIP MAY HAVE FALLEN OFF. CHANNEL ACTIVITY IS NOT DISPLAYED WHILE 1610A IS TRACING.

IF A POD IS CONNECTED TO THE DATA PORT ON REAR OF 1610A, THE CHANNEL ACTIVITY "!" FOR LEAST SIGNIFICANT 2 BITS IS NOT SHOWN (DUE TO SYNCHRONOUS 8 BIT COUNT AND 1610A).

APPENDIX B

DETAILED FIELD(S) DESCRIPTION (CONT'D)

LOGIC POLARITY:

EXAMPLE:      LABEL            A        D        F
         LOGIC POLARITY   [-]      [-]      [+]
             (+, -)

PURPOSE: TO SELECT A LOGIC POLARITY FOR EACH ASSIGNED LABEL.

NUMERICAL BASE:

EXAMPLE:      LABEL            A        B        F
         NUMERICAL BASE   [HEX]    [OCT]    [BIN]
           (BIN, OCT, DEC, HEX)

PURPOSE: TO SELECT A NUMERICAL BASE OF HEXIDECIMAL (HEX),
         OCTAL (OCT), DECIMAL (DEC), OR BINARY (BIN) FOR
         EACH ASSIGNED LABEL.

TRACE POSITION:

EXAMPLE:    [START ] TRACE
            [CENTER] TRACE
            [ END  ] TRACE

PURPOSE: TO SELECT WHETHER THE TRACE STARTS, IS CENTERED
         OR ENDS UPON A DESIGNATED STATE (WHICH MAY BE
         CALLED THE TRIGGER STATE). ADDITIONALLY, THE
         TRIGGER STATE MAY BE DEFINED TO BE A SPECIFIED
         NUMBER OF OCCURRENCES OF A DESIGNATED STATE.

EXAMPLE:       LABEL               A        OCCUR
               BASE               HEX        DEC

FIND IN SEQUENCE       10       00001
                  THEN             20       00001
                  THEN             30       00005
            [START] TRACE          40       00001

SEQ. RESTART [ON]      50

COMMENT: THIS EXAMPLE HAS THE FOLLOWING MEANING FOR DEFINING
         TRACE POSITION:

FIND IN SEQUENCE 00001 OCCURANCE OF STATE 10, THEN
         THE 00001 OCCURANCE OF STATE 20, THEN THE 00005 OCCURANCE
         OF STATE 30, AND [START] TRACE AT 00001 OCCURANCE
         OF STATE 40.

IF DURING THIS SEQUENCE THE RESTART STATE 50 IS
         ENCOUNTERED BEFORE REACHING THE 00001 OCCURANCE OF
         STATE 40, THE MEASUREMENT RESTARTS TO AGAIN FIND IN SEQUENCE
         THE 00001 OCCURANCE OF STATE 10, THEN 00001 OCCURANCE
         OF STATE 20, ETC.

APPENDIX B

DETAILED FIELD(S) DESCRIPTION (CONT'D)

NOTE: IF A SEQUENCE STATE IS DEFINED TO BE THE SAME AS THE RESTART STATE, THE SEQUENCE STATE DOMINATES.
IF [CENTER] OR [END] WERE SELECTED, SELECTIVE TRACE STARTS AT COMPLETION OF 5 OCCURANCES OF STATE 30 (SEE SELECTIVE TRACE).

SELECTIVE TRACE:

EXAMPLE:  LABEL          A          OCCUR
   [ALL STATES]

PURPOSE: TO TRACE ALL STATES.

EXAMPLE:   LABEL    A       OCCUR
           BASE     HEX     DEC
  TRACE
   [ONLY STATE]     60      00001
       OR           7X
       OR           8X

PURPOSE: TO SELECTIVELY TRACE DESIRED STATES; STATES NOT MEETING THE SELECTION CRITERIA ARE SIMPLY NOT INCLUDED IN THE TRACE.

COMMENTS: THE ABOVE EXAMPLE HAS FOLLOWING MEANING:

DO A SIMULTANEOUS TRACE OF 00001 OCCURANCE OF STATES 60 OR 7X (70 TO 7F) OR 8X (80 TO 8F).

COUNT:

EXAMPLE:    LABEL   A
            BASE    HEX

COUNT [ OFF ]
   COUNT [STATE]    7X
   COUNT [TIME ]

PURPOSE: TO SELECT COUNT MEASUREMENT TO BE [OFF], OR IF ON, TO BE COUNT [STATE] OR COUNT [TIME].

COMMENT: WHEN COUNT IS [OFF], THE TRACE LIST DOES NOT SHOW COUNT DATA FOR THE NEXT TRACE MEASUREMENT.

WHEN COUNT [STATE] IS SELECTED A 32 BIT COUNT OF THE SELECTED STATE 7X (70 TO 7F) IS STORED IN MEMORY WITH EACH POD DATA STATE STORED. THE RESULTANT COUNT DATA IS DISPLAYED IN THE TRACE LIST FOR THE NEXT TRACE MEASUREMENT.

WHEN COUNT [TIME] IS SELECTED A COUNT VALUE OF TIME IS STORED FOR EACH POD DATA STATE STORED IN MEMORY. THE RESULTANT TIME DATA IS DISPLAYED IN THE TRACE LIST FOR THE NEXT TRACE MEASUREMENT.

APPENDIX B

DETAILED FIELD(S) DESCRIPTION (CONT'D)

STATE COUNT OR TIME [ABS], [REL]:

EXAMPLE:

| LABEL BASE | A HEX | STATE COUNT DEC [ABS] |
|---|---|---|
| SEQUENCE | 10 | −  1043 |
| SEQUENCE | 20 | −  1033 |
| SEQUENCE | 30 | −  1023 |
| START | 40 | 0 |
| +01 | 60 | +  20 |
| +02 | 70 | +  30 |
| +03 | 71 | +  31 |
| ⋮ | ⋮ | ⋮ |

| LABEL BASE | A HEX | STATE COUNT DEC [REL] |
|---|---|---|
| SEQUENCE | 10 | |
| SEQUENCE | 20 | 10 |
| SEQUENCE | 30 | 20 |
| START | 40 | 1023 |
| +01 | 60 | 20 |
| +02 | 70 | 10 |
| +03 | 71 | 1 |
| ⋮ | ⋮ | ⋮ |

| LABEL BASE | A HEX | TIME DEC [ABS] |
|---|---|---|
| SEQUENCE | 10 | −  208.3 US |
| SEQUENCE | 20 | −  200.2 US |
| SEQUENCE | 30 | −  185.1 US |
| START | 40 | .0 US |
| +01 | 60 | +  80.0 US |
| +02 | 70 | +  120.9 MS |
| +03 | 71 | +  122.5 MS |
| ⋮ | ⋮ | ⋮ |

PURPOSE: TO VIEW THE TRACE LIST AND SELECT [ABS] OR [REL] FOR THE STATE COUNT OR TIME DATA.

COMMENTS: WHEN ABSOLUTE [ABS] IS SELECTED THEN EACH STATE COUNT OR TIME IS DISPLAYED IN +/− ABSOLUTE VALUES WITH RESPECT TO THE START STATE 40. ALL STATES BEFORE THE START STATE 40 ARE SHOWN WITH "−" COUNT VALUES. START STATE 40 IS SHOWN AS ALWAYS 0. ALL STATES SHOWN AFTER THE START STATE 40 ARE SHOWN WITH "+" COUNT VALUES.

WHEN RELATIVE [REL] IS SELECTED, THEN EACH STATE COUNT OR TIME IS DISPLAYED SHOWING COUNT VALUES RELATIVE TO THE PREVIOUS STATE COUNT VALUE (IF VALID) WITHOUT SIGN.

APPENDIX B

DETAILED FIELD(S) DESCRIPTION (CONT'D)

GRAPHED LABEL:

EXAMPLE:
    GRAPHED LABEL [A]

GRAPHED LABEL [F]

PURPOSE:  TO SELECT A DEFINED LABEL A,B,C,D,E, OR F TO BE GRAPHED.

UPPER/LOWER LIMITS:

EXAMPLE:
    UPPER LIMIT
        177

LOWER LIMIT
        000

PURPOSE:  TO CHANGE THE UPPER OR LOWER GRAPH LIMITS.

COMMENT:  GRAPH LIMITS MAY BE CHANGED USING ENTRY KEYS OR THE LIMITS MAY BE AUTOMATICALLY INCREMENTED OR DECREMENTED USING THE INCR OR DECR KEYS IN THE EDIT BLOCK.

THE UPPER LIMIT MUST BE GREATER THAN LOWER LIMIT, OR ELSE AN "ERROR-OVERLAPPING LIMITS" IS DISPLAYED IN PLACE OF THE GRAPH, WHICH IS NOT DISPLAYED.

COMPARED TRACE MODE:

EXAMPLE:
```
          LABEL      A           COMPARED
          BASE       HEX         TRACE MODE
                                 [OFF]

SEQUENCE   00
          SEQUENCE   00
          SEQUENCE   00
            START    00
            +01      30
            +02      00
```

PURPOSE:  TO SHOW THE "EXCLUSIVE OR" OF CURRENT DATA WITH STORED DATA. ALL ZEROS IMPLIES THAT THE SAME DATA IS IN BOTH FILES, WHILE ANYTHING ELSE (30) SHOWS DATA STATES IN THE TWO TRACES WHICH ARE NOT EQUAL (BITS 4 AND 5, ASSUMING THAT THE LSB IS BIT 0).

EXAMPLE:
```
          LABEL      A           COMPARED
          BASE       HEX         TRACE MODE
                                 [STOP=]

LABEL      A           COMPARED
          BASE       HEX         TRACE MODE
                                 [STOP#]
```

APPENDIX B

DETAILED FIELD(S) DESCRIPTION (CONT'D)

PURPOSE: TO SELECT THE COMPARED TRACE MODE TO BE STOP WHEN EQUAL [STOP=], OR STOP WHEN NOT EQUAL [STOP#].

COMMENTS: WHEN [STOP=] IS CHOSEN THE MEASUREMENT IS TRACED REPEATEDLY UNTIL THE VALID CURRENT DATA EQUALS THE VALID STORED DATA. THE STATUS OF INSTRUMENT WILL BE

"COMPARED TRACE-FAILED"

WHICH MEANS THAT THE CURRENT DATA DOES NOT EQUAL THE STORED DATA. THE 1610A THEN TRACES AGAIN SHOWING

"COMPARED TRACE-IN PROCESS"

AND COMPARES ANOTHER SET OF TRACE DATA. THIS PROCESS CONTINUES UNTIL THE STATUS IS

"COMPARED TRACE-COMPLETE"

WHICH MEANS THE VALID CURRENT FILE TRACE DATA EQUALS THE VALID STORED FILE TRACE DATA.

A SIMILAR OPERATION EXISTS FOR [STOP#], EXCEPT ITS MEASUREMENT CONTINUES UNTIL FILES DO NOT COMPARE.

NOTE: THIS IS NOT A REAL-TIME MEASUREMENT, BUT RATHER A "SAMPLED COMPARED MODE" THAT IS DEPENDENT IN PART UPON DATA CLOCK RATES AND TRACE SPECIFICATION. THIS MEASUREMENT MODE MUST BE TURNED [OFF] TO OBTAIN THE SINGLE OR CONTINUOUS TRACE MODES.

What is claimed is:

1. Apparatus for selecting, storing and displaying a set of states occurring in a collection of digital signals, the apparatus comprising:
   input means coupled to receive the collection of digital signals for performing signal conditioning thereon according to preselected thresholds to produce a collection of conditioned signals;
   trace specification means for specifying state conditions in the collection of digital signals according to which the set of states to be stored and displayed is selected from among the states occurring in the collection of digital signals;
   recognition means coupled to the collection of conditioned signals and responsive to the trace specification means for producing control signals indicative of whether or not a state is to be stored;
   timer means for producing a collection of digital time signals indicative of the passage of time;
   storage means coupled to the collections of conditioned signals and digital time signals and to the control signals for storing the set of states selected by the trace specification means and also for storing a time associated with each such selected state;
   display means coupled to the storage means for displaying the set of stored states in correlated relation with their associated times.

2. Apparatus as in claim 1 wherein the displayed times represent values on a single absolute time scale having its origin not later than the first state selected for storage in the storage means.

3. Apparatus as in claim 1 wherein the displayed times represent the elapsed time intervals between the storage of each stored state and the storage of its predecessor.

4. Apparatus for selecting, storing and displaying a set of states occurring in a collection of digital signals, the apparatus comprising:
   input means coupled to receive the collection of digital signals for performing signal conditioning thereon according to preselected thresholds to produce a collection of conditioned signals;
   trace specification means for specifying state conditions in the collection of digital signals according to which the set of states to be stored and displayed is selected from among the states occurring in the collection of digital signals;
   recognition means coupled to the collection of conditioned signals and responsive to the trace specification means for producing control signals indicative of whether or not a state is to be stored;
   count qualification means coupled to the collection of conditioned signals for recognizing a selected state occurring in the collection of digital signals and for producing a qualified count signal upon each such recognition;

counter means coupled to the qualified count signal for producing a collection of digital count signals indicative of the number of times the selected state has occurred;

storage means coupled to the collections of conditioned signals and digital count signals and to the control signals for storing the set of states selected by the trace specification means and also for storing the count associated with each such selected state;

display means coupled to the storage means for displaying the set of stored states in correlated relation with their associated count.

5. Apparatus as in claim 4 wherein the displayed counts represent values on a single monotonically increasing scale having its origin not later than the first state selected for storage in the storage means.

6. Apparatus as in claim 4 wherein the displayed counts represent the various number of occurrences of the selected state inbetween the storage of each stored state and the storage of its predecessor.

* * * * *

UNITED STATES PATENT AND TRADEMARK OFFICE
CERTIFICATE OF CORRECTION

PATENT NO. : 4,445,192

DATED : April 24, 1984

INVENTOR(S) : George A. Haag et al.

It is certified that error appears in the above-identified patent and that said Letters Patent is hereby corrected as shown below:

Column 1, line 9, "George H. Haag" should be --George A. Haag--;

Column 2, line 36-37, "Contiguous channels" should be --Contiguous data channels--;

Column 6, line 9, "application" should be --Application--;

Signed and Sealed this

Twenty-third Day of October 1984

[SEAL]

Attest:

Attesting Officer

GERALD J. MOSSINGHOFF

Commissioner of Patents and Trademarks